United States Patent
Glover

(10) Patent No.: US 10,769,674 B2
(45) Date of Patent: Sep. 8, 2020

(54) GENERATION AND RENDERING SYSTEM FOR ADVERTISEMENT OBJECTS WITH COMPUTER-SELECTED CONDITIONAL CONTENT

(71) Applicant: Samsung Electronics Co., Ltd., Suwon-si, Gyeonggi-do (KR)

(72) Inventor: Eric Glover, Palo Alto, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 762 days.

(21) Appl. No.: 15/397,610

(22) Filed: Jan. 3, 2017

(65) Prior Publication Data
US 2017/0236163 A1   Aug. 17, 2017

Related U.S. Application Data

(60) Provisional application No. 62/324,296, filed on Apr. 18, 2016, provisional application No. 62/273,484, filed on Dec. 31, 2015.

(51) Int. Cl.
*G06Q 30/00* (2012.01)
*G06Q 30/02* (2012.01)

(52) U.S. Cl.
CPC ..... *G06Q 30/0271* (2013.01); *G06Q 30/0269* (2013.01); *G06Q 30/0277* (2013.01)

(58) Field of Classification Search
CPC ...................... G06Q 30/0271; G06Q 30/0277
USPC .......... 705/14.49, 14.64, 14.66, 14.67, 14.73
See application file for complete search history.

(56) References Cited

U.S. PATENT DOCUMENTS

| 5,717,923 | A | * | 2/1998 | Dedrick | G06Q 30/0253 |
| 5,848,396 | A | * | 12/1998 | Gerace | G06Q 30/02 705/7.33 |
| 5,991,735 | A | * | 11/1999 | Gerace | G06Q 30/02 705/7.29 |
| 7,853,700 | B2 | * | 12/2010 | Lee | G06Q 30/02 705/7.29 |

(Continued)

OTHER PUBLICATIONS

Xanthopoulos, Spyros, et al. "A Comparative Analysis of Cross-Platform Development Approaches for Mobile Applications." ACM: BCI 2013, Thessaloniki, Greece. (Year: 2013).*

(Continued)

*Primary Examiner* — Luis A Brown
(74) *Attorney, Agent, or Firm* — Jefferson IP Law, LLP

(57) ABSTRACT

A method of operating a user device includes receiving, by a processing device of the user device, a conditional ad object from a remote user device. The conditional ad object includes two or more instances of conditional content, one or more access mechanisms, and one or more conditions. Each condition is associated with a respective instance of conditional content when verified. The method includes analyzing the one or more conditions to determine if any of the one or more conditions are met. The method includes selecting a selected instance of the two or more instances of conditional content based on the analyzing of the one or more conditions. The method includes generating a user-selectable link based on the selected instance of conditional content and the one or more access mechanisms. The method includes outputting the user-selectable link via a user interface of the user device.

18 Claims, 8 Drawing Sheets

(56) References Cited

U.S. PATENT DOCUMENTS

| | | | | |
|---|---|---|---|---|
| 7,962,604 B1* | 6/2011 | Morris | G06Q 30/02 | 705/14.4 |
| 8,321,534 B1* | 11/2012 | Roskind | H04N 21/25808 | 709/220 |
| 8,666,811 B1* | 3/2014 | Chen | G06Q 30/00 | 705/14.26 |
| 9,152,674 B2* | 10/2015 | Glover | G06F 16/24578 | |
| 9,792,101 B2* | 10/2017 | Boudville | G06F 16/95 | |
| 2001/0029525 A1* | 10/2001 | Lahr | G06F 16/9566 | 709/218 |
| 2002/0042738 A1* | 4/2002 | Srinivasan | G06Q 30/0255 | 705/14.43 |
| 2003/0106022 A1* | 6/2003 | Goodacre | H04M 1/72563 | 715/226 |
| 2005/0096979 A1* | 5/2005 | Koningstein | G06Q 30/0246 | 705/14.68 |
| 2005/0096980 A1* | 5/2005 | Koningstein | G06Q 30/0257 | 705/14.41 |
| 2005/0235048 A1* | 10/2005 | Costa-Requena | H04L 65/1026 | 709/219 |
| 2006/0074769 A1* | 4/2006 | Looney | G06Q 30/0251 | 705/14.66 |
| 2006/0149624 A1* | 7/2006 | Baluja | H04L 67/18 | 705/14.53 |
| 2006/0271438 A1* | 11/2006 | Shotland | G06Q 30/0283 | 705/14.46 |
| 2007/0022442 A1* | 1/2007 | Gil | H04M 1/72561 | 725/62 |
| 2007/0300152 A1* | 12/2007 | Baugher | G06Q 30/0258 | 715/210 |
| 2008/0092159 A1* | 4/2008 | Dmitriev | H04N 21/26258 | 725/34 |
| 2009/0055523 A1* | 2/2009 | Song | H04L 67/22 | 709/224 |
| 2010/0036717 A1* | 2/2010 | Trest | G06Q 30/0266 | 705/14.1 |
| 2010/0070373 A1* | 3/2010 | Zoeter | G06O 30/0601 | 705/14.71 |
| 2010/0222040 A1* | 9/2010 | Bosan | G06Q 30/02 | 455/414.1 |
| 2012/0254188 A1* | 10/2012 | Koperski | G06F 16/9535 | 707/740 |
| 2012/0278722 A1* | 11/2012 | Raleigh | G06F 15/177 | 715/735 |
| 2012/0289147 A1* | 11/2012 | Raleigh | H04N 21/6547 | 455/3.06 |
| 2013/0018731 A1* | 1/2013 | Morris | G06Q 30/0243 | 705/14.66 |
| 2013/0311285 A1* | 11/2013 | Abrol | G06F 16/951 | 705/14.54 |
| 2013/0337785 A1* | 12/2013 | Delug | H04W 4/60 | 455/414.1 |
| 2014/0172563 A1* | 6/2014 | Amit | G06Q 50/01 | 705/14.54 |
| 2014/0236386 A1* | 8/2014 | Yoshizawa | B60W 30/095 | 701/1 |
| 2014/0250106 A1* | 9/2014 | Shapira | G06F 16/248 | 707/722 |
| 2014/0258013 A1* | 9/2014 | Collins | G06Q 30/0256 | 705/26.3 |
| 2014/0258014 A1* | 9/2014 | Collins | G06Q 30/08 | 705/26.3 |
| 2014/0316890 A1* | 10/2014 | Kagan | G06Q 30/0275 | 705/14.54 |
| 2015/0095160 A1* | 4/2015 | Ma | G06Q 30/0267 | 705/14.64 |
| 2015/0134436 A1* | 5/2015 | Lambert | G06Q 20/3274 | 705/14.26 |
| 2015/0161149 A1* | 6/2015 | Genera | G06F 16/9537 | 707/711 |
| 2015/0193546 A1* | 7/2015 | Lipton | G06F 9/445 | 717/178 |
| 2015/0227633 A1* | 8/2015 | Shapira | G06F 16/338 | 707/706 |
| 2015/0254367 A1* | 9/2015 | Kagan | G06F 16/957 | 707/706 |
| 2015/0332310 A1* | 11/2015 | Cui | G06Q 30/0246 | 705/14.45 |
| 2015/0371263 A1* | 12/2015 | Kagan | G06F 16/9537 | 705/14.54 |
| 2016/0034957 A1* | 2/2016 | Kagan | G06Q 30/0256 | 705/14.54 |
| 2016/0063535 A1* | 3/2016 | Xu | G06Q 30/0241 | 705/14.4 |
| 2016/0085521 A1* | 3/2016 | Savliwala | H04L 67/42 | 717/108 |
| 2016/0092919 A1* | 3/2016 | Coleman, Jr. | G06Q 30/0255 | 705/14.53 |
| 2016/0148262 A1* | 5/2016 | Glover | G06Q 30/0276 | 705/14.54 |
| 2016/0162555 A1* | 6/2016 | Shapira | G06F 3/0482 | 707/722 |
| 2016/0189225 A1* | 6/2016 | Glover | G06F 16/9537 | 705/14.55 |
| 2016/0307237 A1* | 10/2016 | Glover | G06Q 30/0276 | |
| 2016/0313893 A1* | 10/2016 | Xu | G06F 3/0482 | |
| 2016/0358215 A1* | 12/2016 | Glover | G06F 16/9537 | |
| 2016/0358216 A1* | 12/2016 | Glover | G06Q 30/0261 | |
| 2016/0364759 A1* | 12/2016 | Glover | G06F 16/9537 | |
| 2016/0371729 A1* | 12/2016 | Glover | G06Q 30/0248 | |
| 2017/0140421 A1* | 5/2017 | Filev | G06Q 30/02 | |
| 2017/0178038 A1* | 6/2017 | Guven | G06Q 30/016 | |
| 2017/0186038 A1* | 6/2017 | Glover | G06Q 30/0267 | |
| 2017/0207915 A1* | 7/2017 | Reed | G06F 16/2255 | |
| 2017/0329591 A1* | 11/2017 | Lipton | G06F 8/61 | |

OTHER PUBLICATIONS

Han, Seungyeop, et al. "A Study of Third-Party Tracking by Mobile Apps in the Wild." University of Washington Technical Report, CSE, Mar. 1, 2012. (Year: 2012).*

* cited by examiner

GENERATION AND RENDERING SYSTEM FOR ADVERTISEMENT OBJECTS WITH COMPUTER-SELECTED CONDITIONAL CONTENT

CROSS-REFERENCE TO RELATED APPLICATIONS

The application claims priority to U.S. Provisional Patent App. No. 62/324,296, filed on Apr. 18, 2016 and to U.S. Provisional Patent App. No. 62/273,484, filed on Dec. 31, 2015. The entire disclosures of the applications referenced above are incorporated by reference.

FIELD

The disclosure relates to a system and method for displaying advertisements with conditional content.

BACKGROUND

Digital marketing and electronic advertising helps drive today's economy. One reason that advertisers find more value in digital advertising over traditional forms of advertising, such as print and television advertising, is that digital advertising allows advertisers to better target potential consumers because of information about the user that is readily available on the user device. For instance, if the advertiser knows a particular user likes an obscure sport such as disc golf, the advertiser can provide disc-golf-related advertisements to the user. Similarly, if an advertiser knows that a user is walking past a particular diner, the advertiser can present an advertisement for the diner to the user as he or she walks by.

Typically the user would not be presented with such advertisements unless the advertiser was aware of the user's preferences, location, or other private information. The tradeoff, however, is the user's privacy. While consumers prefer better-targeted advertising, consumers do not like knowing that their personal information may be readily available to an unintended person such as an advertiser. In fact, such perceived invasions of privacy by a particular application may steer users away from the particular application.

SUMMARY

A method of operating a user device includes receiving, by a processing device of the user device, a conditional ad object from a remote user device. The conditional ad object includes two or more instances of conditional content, one or more access mechanisms, and one or more conditions. Each condition is associated with a respective instance of conditional content when verified. The method includes analyzing, by the processing device, the one or more conditions to determine if any of the one or more conditions are met. The method includes selecting, by the processing device, a selected instance of the two or more instances of conditional content based on the analyzing of the one or more conditions. The method includes generating, by the processing device, a user-selectable link based on the selected instance of conditional content and the one or more access mechanisms. The method includes outputting, by the processing device, the user-selectable link via a user interface of the user device.

In other features, the one or more conditions include a condition directed to verifying an installation status of a particular application and, when a native application edition of the particular software application is installed on the user device, the condition indicates one of the instances of the conditional content to select. In other features, analyzing the one or more conditions includes requesting a list of installed applications from an operating system of the user device and cross-checking the list of installed applications for the particular application.

In other features, the one or more conditions include a condition directed to verifying an account status of a user with respect to a particular application, and when the user has an account registered for the particular application, the condition indicates one of the instances of the conditional content to select. In other features, analyzing the one or more conditions includes requesting a list of user accounts from an operating system of the user device and cross-checking the list of user accounts for the particular application. The list of user accounts indicates applications to which the user has an account.

In other features, the one or more conditions include a condition directed to verifying whether a particular application was accessed on the user device within a specified time period, and when the particular application has been accessed within the specified time period, the condition indicates one of the instances of the conditional content to select. In other features, analyzing the one or more conditions includes requesting a list of recently accessed applications from an operating system of the user device and cross-checking the list of recently accessed applications for the particular application. The list of recently accessed applications indicates applications that were accessed within a time period.

In other features, the one or more conditions include a condition directed to verifying whether an output of a sensor of the user device indicates a particular external environmental condition relative to the user device exists, and when the particular external environmental condition is verified as existing, the condition indicates one of the instances of the conditional content to select. In other features, analyzing the one or more conditions includes requesting a sensor reading from the sensor of the user device and comparing the sensor reading to a specified value to determine whether the external environmental condition exists. In other features, the conditional ad object is received in response to an ad request or a search query.

A non-transitory computer-readable medium has a set of computer-readable instructions stored thereon. The computer-readable instructions, when executed by a processing device of a user device, cause the processing device to receive a conditional ad object from a remote user device. The conditional ad object includes two or more instances of conditional content, one or more access mechanisms, and one or more conditions. Each condition is associated with a respective instance of conditional content when verified. The computer-readable instructions analyze the one or more conditions to determine if any of the one or more conditions are met. The computer-readable instructions select a selected instance of the two or more instances of conditional content based on the analysis of the one or more conditions. The computer-readable instructions generate a user-selectable link based on the selected instance of conditional content and the one or more access mechanisms. The computer-readable instructions output the user-selectable link via a user interface of the user device.

In other features, the one or more conditions include a condition directed to verifying an installation status of a particular application and, when a native application edition of the particular software application is installed on the user device, the condition indicates one of the instances of the conditional content to select. In other features, analyzing the one or more conditions includes requesting a list of installed applications from an operating system of the user device and cross-checking the list of installed applications for the particular application. In other features, the one or more conditions include a condition directed to verifying an account status of a user with respect to a particular application, and when the user has an account registered for the particular application, the condition indicates one of the instances of the conditional content to select.

In other features, analyzing the one or more conditions includes requesting a list of user accounts from an operating system of the user device and cross-checking the list of user accounts for the particular application. The list of user accounts indicates applications to which the user has an account. In other features, the one or more conditions include a condition directed to verifying whether a particular application was accessed on the user device within a specified time period, and when the particular application has been accessed within the specified time period, the condition indicates one of the instances of the conditional content to select.

In other features, analyzing the one or more conditions includes requesting a list of recently accessed applications from an operating system of the user device and cross-checking the list of recently accessed applications for the particular application. The list of recently accessed applications indicates applications that were accessed within a time period. In other features, the one or more conditions include a condition directed to verifying whether an output of a sensor of the user device indicates a particular external environmental condition relative to the user device exists, and when the particular external environmental condition is verified as existing, the condition indicates one of the instances of the conditional content to select.

In other features, analyzing the one or more conditions includes requesting a sensor reading from the sensor of the user device and comparing the sensor reading to a specified value to determine whether the external environmental condition exists. In other features, the conditional ad object is received in response to an ad request or a search query.

An advertising system includes a storage system that stores a plurality of advertisement records. Each advertisement record corresponds to an advertisement and including triggering data, one or more access mechanisms, two or more instances of conditional content, a fee arrangement, and one or more conditions associated with the two or more instances of conditional content. The processing system executes computer-readable instructions. The computer-readable instructions cause the processing system to receive an ad request requesting one or more advertisements from a remote computing device. The computer-readable instructions select an advertisement record based on information contained in the ad request and the triggering data defined in the advertisement record. The computer-readable instructions generate a conditional advertisement object based on the selected advertisement record. The conditional advertisement object includes the two or more instances of conditional content, the one or more access mechanisms, and the one or more conditions contained in the selected advertisement record. The computer-readable instructions transmit the conditional ad object to the remote computing device.

In other features, the remote computing device is a user device. In other features, the remote computing device is a search system and the ad request includes one or more query terms contained in a search query transmitted by a user device to the search system.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
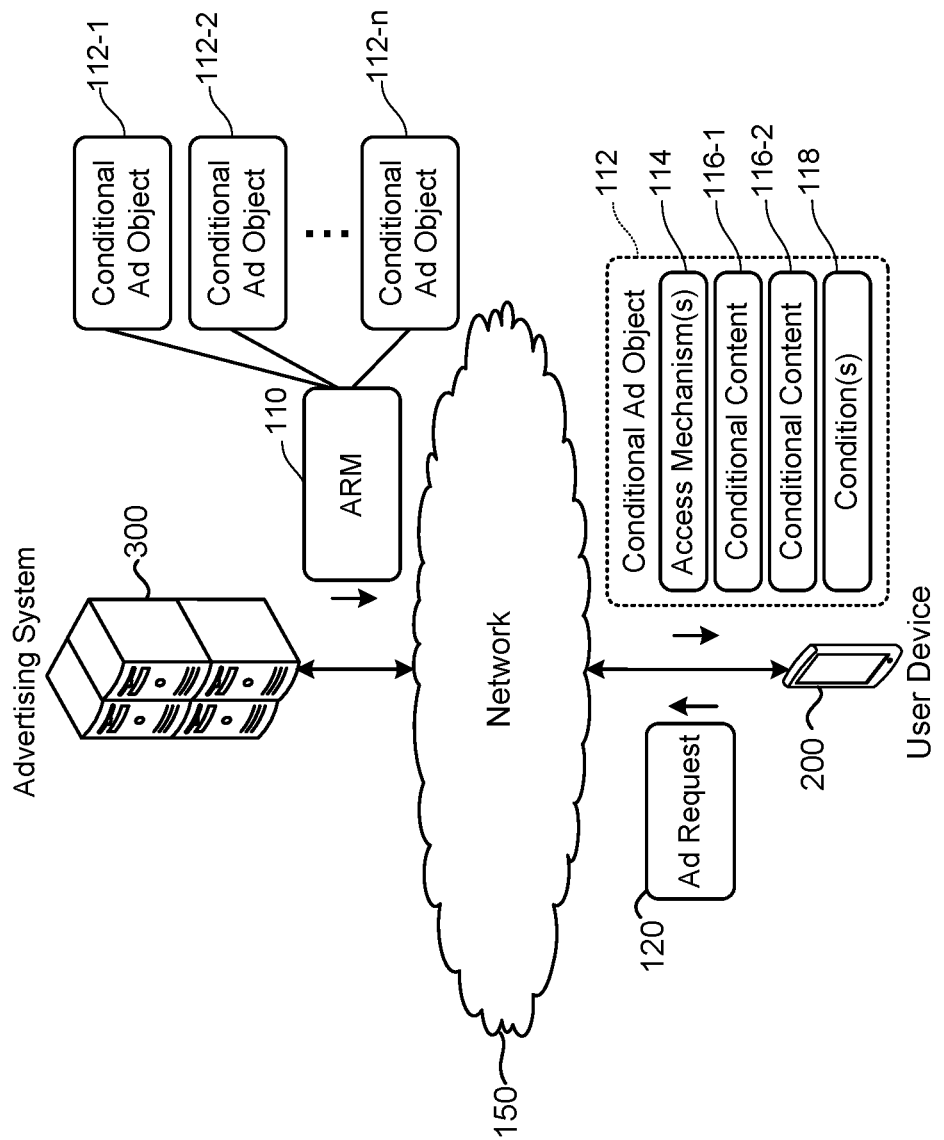
FIGS. 1A and 1B are schematics respectively illustrating an example environment of an advertising system that delivers conditional advertisements.
Figure 1B:
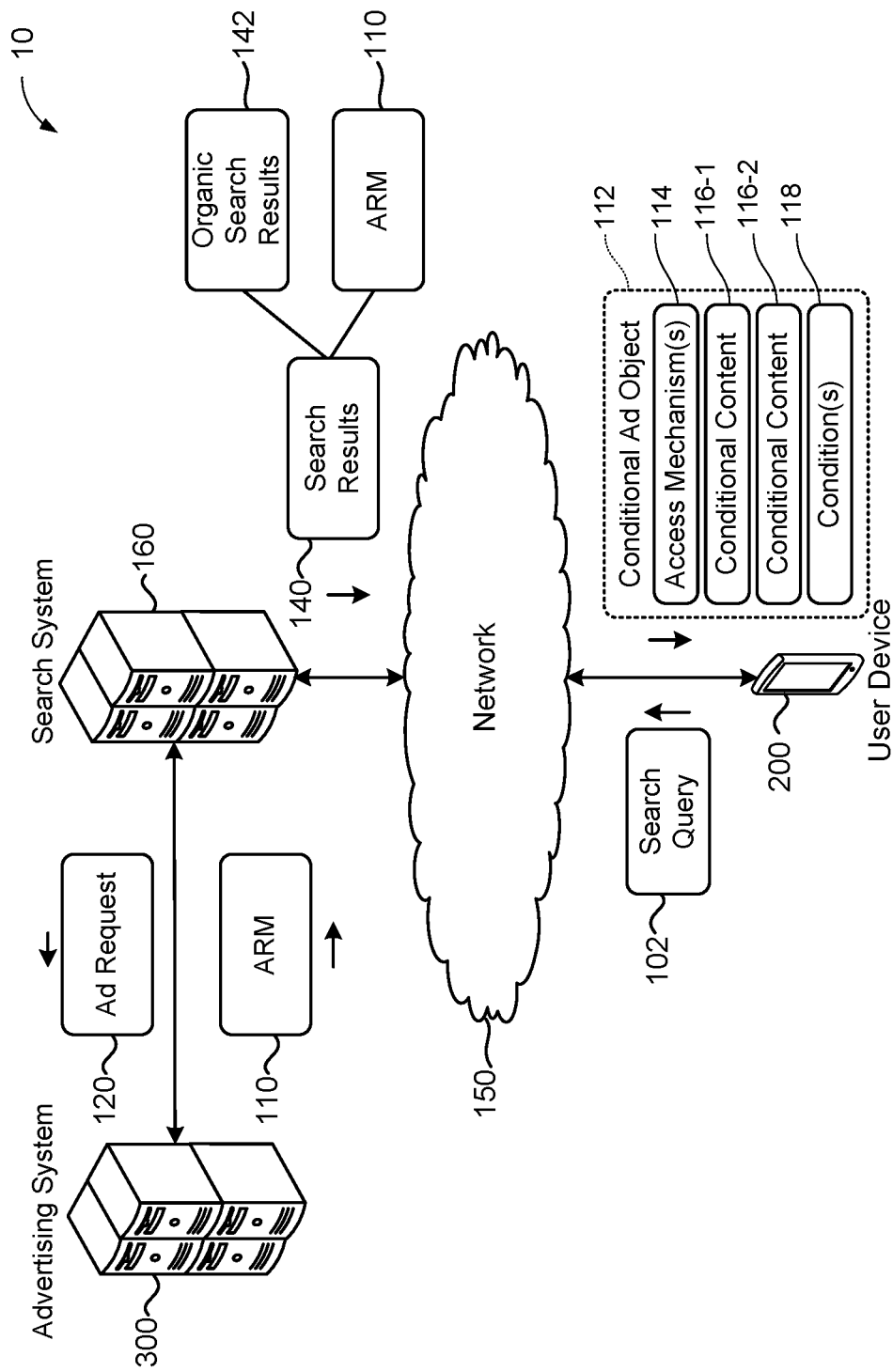

FIGS. 1A and 1B illustrate an example environment 10 of an advertising system 300 that provides an advertisement response message 110 ("ARM" 110) to a user device 200 in response to an advertisement request 120 ("ad request" 120). An advertisement response message is a data structure that contains one or more advertisement objects. An advertisement object (or "ad object") is a data structure that contains data and/or instructions that a user device 200 uses to display an advertisement. An advertisement can refer to a user-selectable link that, when selected by a user (e.g., pressed on or clicked on), sets the state of the user device 200 to a sponsored state of a software application. Traditionally, an advertisement object stores one or more access mechanisms 114 and content.

An access mechanism is a string of characters that is used to access a specified state of a software application. An access mechanism can refer to a web resource identifier (e.g., a URL), an application resource identifier, and/or a script. An application resource identifier is a string of characters that causes a user device 200 to set a native application edition of an application to a specific state indicated by the string of characters. Application resource identifiers may be defined according to custom application URL schemes and may be platform specific (e.g., different application resource identifiers are needed to access different editions of an application on different platforms).

Furthermore, an access mechanism can include a script defining a set of operations for the user device 200 to perform in order to set an application to a particular state. The content contains layout data, text, images, videos, and/or metadata. The layout data may define the look and feel of an advertisement. Thus, the layout data may define where the text, images, and/or videos appear in the user-selectable link, as well as fonts, font sizes, and/or colors appearing in the advertisement.

According to the present disclosure, the advertising system 300 delivers conditional ad objects 112 in an ARM 110. A conditional ad object 112 is an advertisement object that contains one or more conditions 118 and two or more instances of conditional content 116. In the illustrated example, the conditional ad object 112 contains first conditional content 116-1 and second conditional content 116-2. A conditional ad object 112, however, may contain any number of instances of conditional content 116 that is greater than or equal to two.

The user device 200 determines which conditional content 116 to present in a user-selectable link based on whether any of the conditions 118 are met. For example, a condition may be: "if 'Application_A' is installed, display the first content defined in the first conditional content 116-1; otherwise, display the second content." The conditions may be directed to information that is not necessarily shared or shareable with the advertising system 300, but that an advertiser would find useful in determining which content the advertiser would like to display to a user. The conditions 118 may relate to the applications that are installed on the user device 200, the type of the user device 200, the platform of the user device 200, what applications were recently used, whether the user has a specific subscription/account, a location of the user device, and/or the ambient light around the user device 200 at display time.

The content that is presented to the user is selected based on whether the one or more conditions 118 are satisfied at the user device 200. Furthermore, in some implementations, the layout data may vary between the different instances of conditional content 116, whereby the layout of a user-selectable link may depend on whether one or more of the conditions 118 are met. In this way, the look and feel of an advertisement may be altered depending on whether the condition 118 is met. Continuing the example of "Application_A," the layout in the first conditional content 116-1 may include different fonts, font sizes, and/or colors than the layout defined in the second conditional content 116-2. In this way, the advertising system 300 can allow a greater level of customization to advertisers without having to alter the overall advertisement delivery architecture.

The conditional ad object 112 may include a set of access mechanisms 114 that apply to all of the conditional content 116. For example, the set of access mechanisms 114 may include an access mechanism for accessing an installed copy of the relevant native application, another access mechanism for first downloading and installing the relevant native application, and a third access mechanism allowing access to some or all of the relevant native application's functionality via a web interface. For example, the web access mechanism may be used in response to the user expressing a desire not to install apps or as a result of incompatibility, such as between a latest version of the native application and the version of the operating system installed on the user device 200.

In other implementations, the access mechanisms 114 may be tied to the conditional content 116. For example, a first access mechanism 114 may be programmed to activate a native application installed on an ANDROID operating system device, while the conditional content item 116-1 is relevant to devices running the ANDROID operating system. As a result, the first access mechanism 114 would be tied to the conditional content item 116-1.

In some implementations, and for some additional ad objects 112, one or a set of access mechanisms 114 may be specified for each of the conditional content 116. For example, the conditional content item 116-1 may correspond to a first restaurant in a restaurant reservation app and have a set of corresponding access mechanisms to access a particular state corresponding to the first restaurant; meanwhile, the conditional content item 116-2 may correspond to a second restaurant in the restaurant reservation app and have a set of corresponding access mechanisms to access a particular state corresponding to the second restaurant.

The conditional ad object 112 includes one or more conditions 118, which allows the user device 200 to select one or more of the additional content items 116 for surfacing to a user of the user device 200. In traditional advertising, these decisions would not be made at the user device 200, but would need to be made by the advertising system 300. The advertising system 300 is shown as a single entity, but in reality, may be formed from a wide array of ad networks, content providers, and advertisers.

In various implementations, the user device 200 may not be permitted to or may not be programmed to share all of the information to the disparate parties of the advertising system 300 that would allow the advertising system 300 to best select the conditional content 116. For example, whether a specific native application is installed on the user device 200, or whether a specific account (such as NetFlix®) is active on the user device 200, may be information that the user device 200 wishes to keep private.

This desire for privacy may be embedded in the operating system of the user device 200, in a search or advertising framework installed on user device 200 that sends the ad request 120, or may be expressed by the user of the user device 200. According to the present disclosure, the user device 200 can maintain more data privately, while still using the conditional ad object 112 to provide content that is of most relevance to the user, which is beneficial to both the user as well as to the advertiser.

The conditional ad object 112 may specify a condition 118 for each item of the conditional content 116. For example, if there are three items of conditional content 116, there may be three conditions, each corresponding to one of the items of conditional content. In other implementations, or in some conditional ad objects, there may be one fewer condition than the number of conditional content items. For example, the conditional ad object 112 may be processed in order such that a condition corresponding to the first conditional content is evaluated before a condition corresponding to the second conditional content is evaluated. If neither condition is satisfied, a default item of conditional content may be surfaced to the user.

Once one of the items of conditional content is selected, one or more relevant access mechanisms may be selected. For example, if an app corresponding to the selected conditional content is not yet installed, an access mechanism requiring the application to already be installed may be ignored. Meanwhile, a web access mechanisms and a download/install access mechanism may be selected. The user may be given a choice between these two access mechanisms for the conditional content item or, based on user or app preference, one of the access mechanisms may be selected by the user device 200 in response to the user selecting the conditional content item. The user device 200 may make the selection based on business rules. For example, the user device 200 may choose the web access mechanism over the download/install access mechanism if storage space on the user device 200 is at more than 90% capacity.

Each of the conditions 118 may be specified using a format known to the user device 200 or to advertisement platform software installed on the user device 200. For example, a condition may simply be a string, which the user device 200 can evaluate to resolve to either a true or false. If the string evaluates to true, the corresponding conditional content may be surfaced to the user. For example, the user device 200 may understand how to parse the string to identify what condition should be tested. An example, a string such as "Installed: Angry Birds" may cause the user device 200 to determine whether an application whose name contains the string "Angry Birds" is installed on the user device 200. If so, the conditional content corresponding to this condition can be surfaced to the user.

The notation for the condition may be more formal, for example following a convention such as JSON (JavaScript Object Notation). For example, a JSON condition may specify a string such as "ConditionType:" to specify what type of condition to test. As one example, a condition type may be "ApplicationInstalled." Once a ConditionType of "ApplicationInstalled" is present, the user device 200 may look for another string, such as "ApplicationName."

In another condition, the "ConditionType" may be "ApplicationAccessed." When the "ApplicationAccessed" ConditionType is present, a user device 200 may expect a string called "ApplicationName:" to be present. In addition, the user device 200 may look for a "Time:" number. For example, the number may specify a number of days within which the application was accessed. If the application was accessed on the user device 200 within the preceding specified number of days, the condition is true. In some implementations, if the number is absent from the condition, a default may be supplied, such as 30.

The types of conditions handled by the user device 200 may be updated over time as the advertising system 300 develops. Additional examples of potential ConditionTypes described in more detail below include operating system type, presence of certain physical sensors, and current environmental conditions (such as ambient light, acceleration, pressure, etc.).

Some of the conditions 118 may be specified using script or other code that evaluates to a Boolean value. For example, the condition 118 may include a snippet of JavaScript that, when executed on the user device 200 (such as in a sandbox), resolves to either true or false. A result of true indicates that the corresponding conditional content should be surfaced.

In addition to enhancing privacy, conditional ad objects may increase ad relevance, as the user device 200 may be able to perform a more accurate assessment of certain conditions than a remote system could. Further, conditional ad objects may have advantages in speed. The advertising system 300 may generate a conditional ad object 112 prior to having specific information about the user device 200. This conditional ad object 112 can be sent to the user device 200 even before the advertising system 300 would have been able to obtain information about the user device 200. The conditions 118 are evaluated locally by the user device 200 and therefore do not require additional wait time.

In addition, the conditional ad object 112 may include some static content, such as an image or a text string. This static content may be displayed to the user while the condition is being evaluated. In some implementations, the conditional content 116 may include an external link (such as a URL) that requires additional data to be fetched from a remote server, such as image server. The conditional ad object 112 can be evaluated and the most relevant conditional content selected before having to make that request. Then, only the access corresponding to the selected conditional content needs to be made. While the external access is occurring, other portions of the conditional ad object 112, such as the static content, may be presented to the user.

Figure 1D:
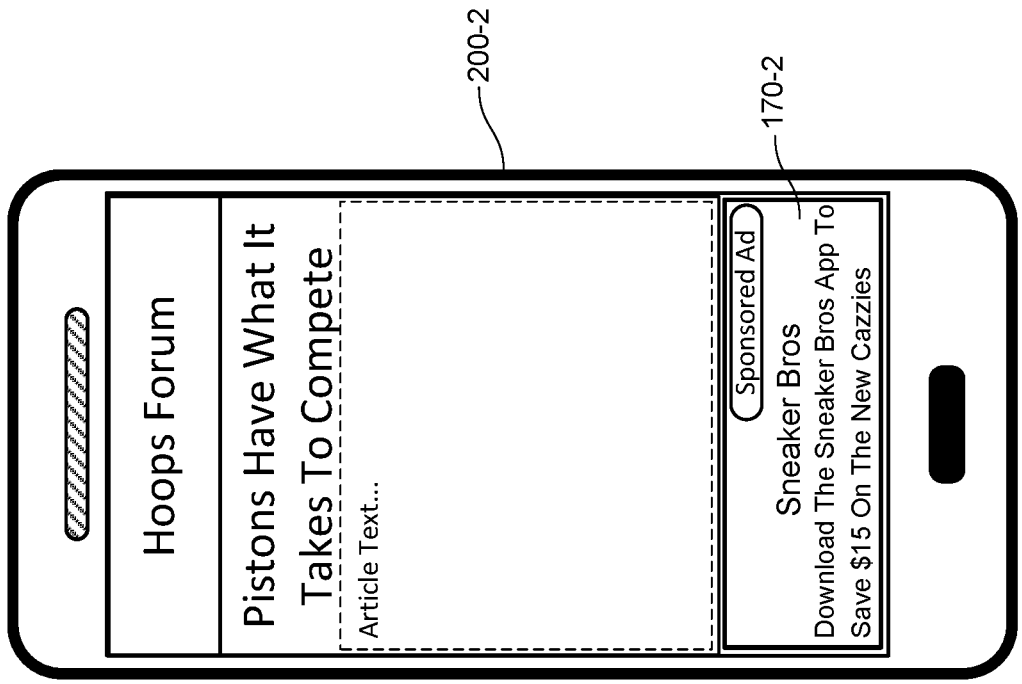
FIGS. 1C and 1D are schematics illustrating examples of a user device displaying conditional content.
Figure 1C:
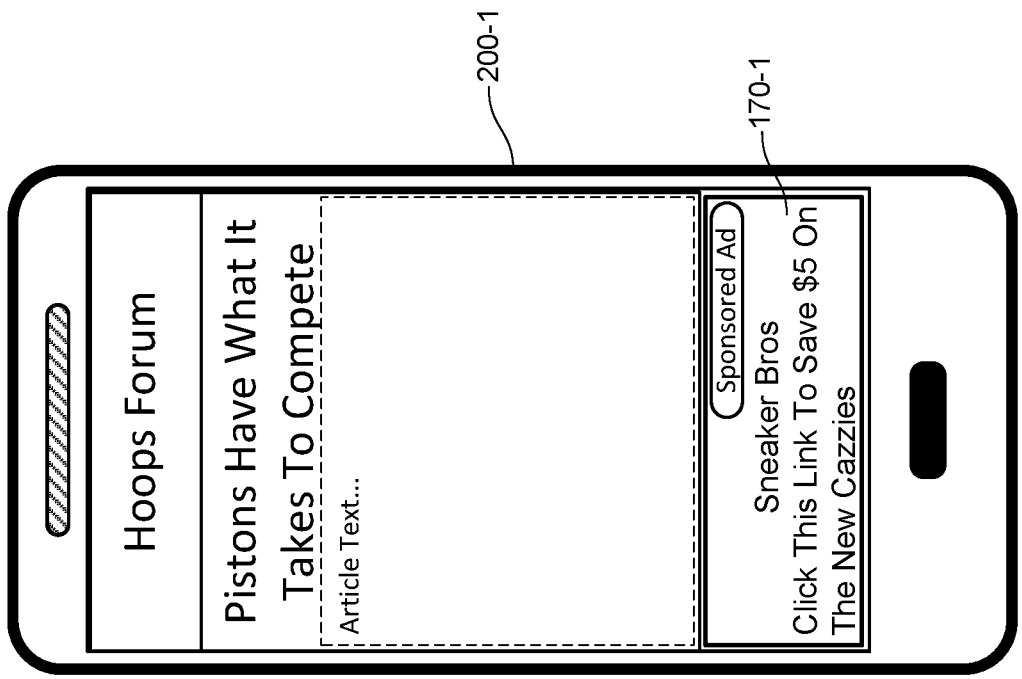

FIGS. 1C and 1D illustrate an example of an advertisement being rendered at a user device 200. In the illustrated example, the condition 118 is whether an application named "Sneaker Bros" is installed on the user device 200. In this example, the first instance of conditional content 116-1 includes text 170-1: "Click This Link To Save $5 On The New Cazzies." The second instance of conditional content 116-2 includes text 170-2: "Download The Sneaker Bros App To Save $15.00 On The New Cazzies."

In the example of FIG. 1C, the user device 200 has the Sneaker Bros application installed on the user device. In the example of FIG. 1D, the user device 200 does not have the Sneaker Bros application installed on the user device 200. Thus, the text 170-1 is displayed by the first device 200-1 because the condition 118 in the conditional ad object 112 is satisfied, while the text 170-2 displayed by the second device 200-2 because the condition 118 is not satisfied. In this way, the advertising system 300 does not need to know what applications are installed on a user device 200, but can deliver a single ad object that is conditioned on the installation status of a particular application (or another suitable condition). In this way, a conditional ad object 112 may be included in an ARM 110 without having to change the entire advertising platform. Put another way, an ARM 110 may contain conditional ad objects 112 and/or traditional ad objects that do not contain conditions and only one instance of conditional content 116.

In the example of FIG. 1B, the user device 200 is in communication with a search system 160. The user device 200 transmits a search query 102 to the search system 160. The search system 160 transmits an ad request 120 to the advertising system 300 in response to the search query 102. The ad request 120 may include the query terms recited in the search query 102. In response to the ad request 120, the advertising system 300 generates an ARM 110 containing a conditional ad object 112 based on the ad request 120 and provides the ARM 110 to the search system 160. The search system 160 can include the conditional ad object 112 or the ARM 110 (which contains the conditional ad object 112) in the search results 140. The search system 160 transmits the search results 140 to the user device 200. In displaying the search results 140, the user device 200 can determine whether the condition(s) 118 in the conditional ad object 112 were met. The user device 200 can then select which instance of conditional content 116 to render as the advertisement (e.g., user-selectable link) based on whether the condition(s) 118 were met. In these implementations, the search query 102 may be considered an ad request, as the transmission of the search query 102 to the search system 160 triggers an ad request 120 to be sent to the advertising system 300.

In the example of FIG. 1B, a search system 160 transmits an ad request 120 to the advertising system 300 upon receiving a search query 102 from the user device 200. In some implementations, the search system 160 may include the search query 102 or a portion thereof in the ad request 120, whereby the advertising system 300 uses one or more of the query terms of the search query 102 to select the conditional ad objects 112 that are included in the ARM 110. The search system 160 determines organic search results 142 and encodes the organic search results 142 with the ARM 110 in the search results 140. The search system 160 provides the search results 140 to the user device 200. The user device 200 then selects which conditional content 116 to display in an advertisement based on the conditions 118 and information specific to the user device 200 or only known at the user device 200.

As used herein, an advertisement can include any digital advertisement. An advertisement includes advertisement content (also referred to as "ad content"). The ad content may include conditional content 116 and/or non-conditional content. Content, conditional or non-conditional, can refer to data that is presented in an advertisement. Content can include text, image, video, and/or audio. A displayed advertisement may further include a user-selectable link (also referred to as a "link"). A link, when selected by a user, sets the state of the user device 200 to a state of a software application. The link may include one or more access mechanisms 114, whereby the user device 200 accesses the linked-to state of the software application using one of the one or more access mechanisms 114. As mentioned, an access mechanism 114 can be a web access mechanism (e.g., a URL), an application access mechanism (e.g., an application resource identifier) or a script.

While an advertisement does not require a link, an advertisement typically contains a link that is based on one or more access mechanisms. In the event a state of an application may be accessed using multiple editions, the linked-to state may be accessed with multiple different access mechanisms depending on the configuration of the application. The advertising system 300 may, however, include conditional advertisement objects used to render any suitable advertisements.

Figure 2:
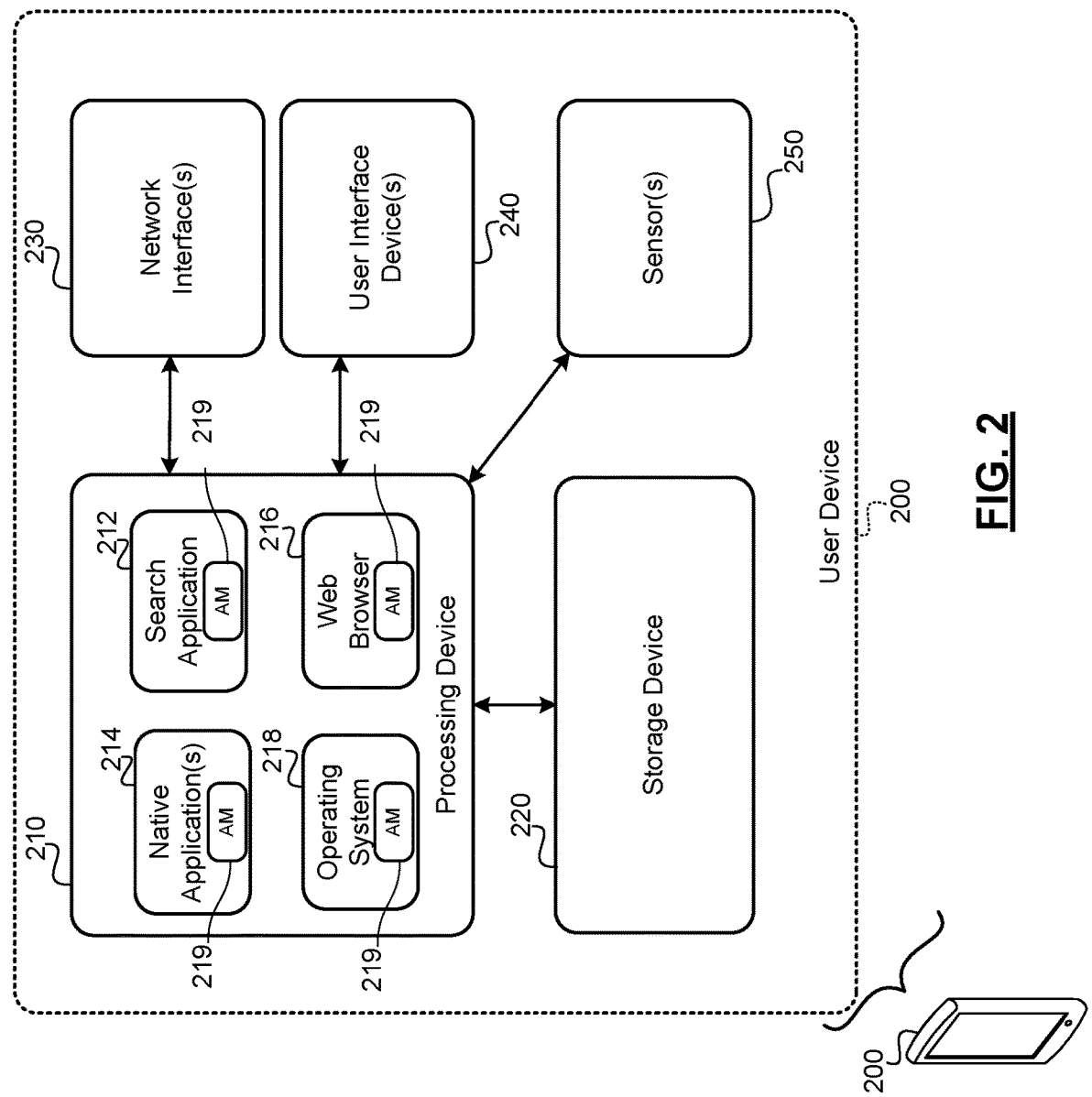
FIG. 2 is a schematic illustrating an example set of components of a user device.

FIG. 2 illustrates an example of a user device 200 configured to display advertisements based on conditional ad objects 112. In the illustrated example, the user device 200 includes a processing device 210, a storage device 220, a network interface 230, a user interface device 240, and sensors 250 (e.g., camera, light sensor, accelerometer, etc.). The user device 200 may include additional components not shown in FIG. 2. The components of the user device 200 may be interconnected by, for example, a bus or other communication circuitry.

The processing device 210 can include one or more processors that execute computer-executable instructions and associated memory (e.g., RAM and/or ROM) that stores the computer-executable instructions. In implementations where the processing device 210 includes more than one processor, the processors can execute instructions in a distributed or individual manner. The processing device 210 can execute an operating system 218, a search application 212 (which may be a native application), one or more native applications 214, and a web browser 216, all of which can be implemented as computer-readable instructions. The operating system 218, the search application 212 (which may be a native application), the one or more native applications 214, and/or the web browser 216 may each include an advertisement module 219 ("ad module" 219).

The storage device 220 can include one or more computer-readable mediums (e.g., hard disk drives, solid state memory drives, and/or flash memory drives). The storage device 220 can store any suitable data that is used by the operating system 218 of the user device 200 and/or any of the applications 212, 214, 216 that are executed by the user device 200. The storage device 220 can be in communication with the processing device 210, such that the processing device 210 can retrieve any needed data therefrom.

The network interface 230 includes one or more devices that are configured to communicate with the network 150. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface device 240 includes one or more devices that receive input from and/or provide output to a user. The user interface device 240 can include, but is not limited to, a touchscreen, a display, a QWERTY keyboard, a numeric keypad, a touchpad, a microphone, and/or speakers.

The search application 212 generates and displays a graphical user interface (GUI) that allows users to enter search queries 102 and that renders and displays search results 140 that are responsive to the search queries 102 in the GUI. In some implementations, the search application 212 presents the search results 140 in a search engine results page (SERP). An individual search result can include a user-selectable link. The user can select a user-selectable link displayed in the search results 140. In response to the user selection of the user-selectable link, the search application 212 instructs the operating system 218 to access the state of the software application corresponding to the selected link.

The search application 212 receives a search query 102 from a user via the user interface device 240. The search application 212 transmits the search query 102 to the search system 160 via the network interface 230. In some implementations, the search application 212 generates a query wrapper (not shown) that includes the search query 102 and one or more context parameters. A context parameter is additional data that the search system 160 can use to determine the search results 140. One example of a context parameter can include a geolocation of the user device 200.

The search application 212 receives search results 140 from the search system 160 and renders the search results 140 based thereon. In some implementations, the search results 140 are encoded in a container such as an iFrame or a .json file (or an analogous format). As previously indicated, the search results include organic search results 142 and one or more ARMs 110. The search application 212 displays the organic search results 142 and one or more of the conditional ad objects 112 contained in the one or more ARMs 110. In some implementations, the ad module 219 determines which content to display in the advertisement. Put another way, the ad module 219 selects the conditional content 116 with which to render the advertisement based on the condition(s) 118 defined in the conditional ad object 112.

The native applications 214 may be any application editions that are installed on the user device 200. Many native applications are configured to display advertisements. Thus, any of the native applications 214 may include an ad module 219 that requests ads to display from the advertising system 300. The ad module 219 is described in greater detail below. A native application 214 may receive an ARM 110 from the advertising system 300. The ad module 219 analyzes the conditional ad objects 112 in the ARM 110 using information pertaining to the user device 200 to determine which conditional content 116 to display in the user-selectable link. These advertisements may be presented by the native application via the user interface device 240.

The web browser 216 is a native application that allows users to access a web application edition of a software application. The web browser 216 requests content from a resource using a web access mechanism (e.g., a URL) and displays the requested content. Either the web browser 216 itself or the web application edition may execute an ad module 219.

The ad module 219 may be a set of computer-readable instructions that are executed by the processing device 210. Alternatively the ad module 219 may be implemented as a service. The ad module 219 contains logic for obtaining user data and selecting which conditional ad objects 112 to display to the user. Furthermore, in some implementations, the ad module 219 generates and transmits an ad request 120. An ad module 219 may be implemented in any suitable application (web or native).

In operation, the ad module 219 may be called in response to any number of actions. For instance, if the ad module 219 is called by the search application 212, the ad module 219 may be called when a user initiates a search by entering a search query 102. Similarly, if the ad module 219 is called by a native application, the native application may call the ad module 219 when the application transitions to a new state or is first launched.

In response to sending an ad request 120, the advertising system 300 returns an ARM 110 containing one or more conditional ad objects 112 to the ad module 219. For each conditional ad object 112, the ad module 219 determines which conditional content 116 to present in the advertisement based on the conditions 118 defined in the conditional ad object 112. Thus, the ad module 219 reads the condition 118 and determines whether the condition is met.

In some implementations, the condition 118 relates to an installation status of a linked to application. In particular, the condition 118 determines whether a native application edition of the application is installed on the user device 200. In response to an application installation status condition 118, the ad module 219 can request a list of native applications that are installed on the user device 200 from, for example, the operating system 218. Alternatively, the ad module 219 may maintain such a list of installed native applications at the user device 200, whereby the ad module 219 can cross-check the list of installed native applications to determine whether the native application indicated in the condition 118 is installed on the user device 200. If the condition is verified, the ad module 219 displays first conditional content 116-1. If the condition cannot be verified, the ad module 219 displays second conditional content 116-2.

In some implementations, the conditions 118 relate to the type of the user device 200. In these implementations, a condition 118 may define two or more device types. A device type can refer to the operating system type and/or a make and model of the user device 200. For example, an image of a device of the same device type may be shown in the advertisement. The conditional ad object 112 may include more than two conditions relating to device type if there are more than two device types recognized by the advertiser. Thus, in these implementations, the conditions may take the form of: (if device type one, then show conditional content one), (if device type two, then show conditional content two) . . . (if device type n, then show conditional content n). Thus, the ad module 219 can select the conditional content 116 based on which condition 118 is met.

In some implementations, a condition 118 relates to whether an application (web or native) was accessed during a recent period (e.g., in the last week or month). In these implementations, the ad module 219 can check the browser history of the web browser 216 and/or can request a list of recently accessed applications from the operating system (or a third-party launcher of the user device 200). The browser history and the list of recently accessed applications may be filtered to only show applications accessed during the recent period. The ad module 219 may then cross-check the filtered list to determine whether the condition 118 is met. If so, the ad module 219 can display first conditional content 116-1. If the condition is not met, the ad module 219 can display second conditional content 116-2.

In some implementations, the conditions 118 relate to whether the user has an active account registered for a particular application or service. For example, the condition may ask whether the user is a registered user of the SKYPE communication application. If so, the selected conditioned content 116 may be: "Remember this holiday season to use Skype to call your friends." If the user is not a registered user of the SKYPE communication application, the selected content may be: "Sign Up for Skype to call your friends this holiday season." In these implementations, the ad module 219 may request a list of accounts that are associated with the user device 200 from the operating system 218. The list of accounts may indicate all of the applications on which the user of the user device 200 has an account. The ad module 219 may cross-check the list of accounts with the application indicated in the condition 118 to determine whether the condition is met. If the condition is met, the ad module 219 can display first conditional content 116-1. If the condition is not met, the ad module 219 can display second conditional content 116-2.

In some implementations, the conditions 118 relate to the environment around the user (e.g., light or temperature). In these implementations, the conditions 118 may require a reading from a sensor 250 (or equivalent of a sensor) to determine whether an environmental condition 118 is met.

For example, a condition 118 may relate to an ambient light brightness at the user device 200. In the event the brightness is above a certain value, the ad module 219 can display first conditional content 116-1 in the advertisement. If the brightness is below a certain value, the ad module 219 can display second conditional content 116-2 in the advertisement. In these examples, the conditional content 116 may be optimized for the brightness surrounding the user device 200. For example, first conditional content 116-1 may include a layout that has a high degree of contrast in brighter settings and second conditional content 116-2 may include a layout that has a lower degree of contrast but brighter text colors in darker settings.

The condition 118 may test other sensor 250 outputs. For example, a condition 118 may check the output of an accelerometer or a gyroscope to determine whether a user is walking, idle, or in a moving vehicle. In another example, a condition may check the output of the microphone to determine the ambient noise level in the area proximate to the user device 200. In this situation, the first conditional content 116-a may include video or audio, while the second conditional content 116-b may include only text and/or images. In this example, the video or audio may be played if the ambient noise level is below a threshold (or above a certain threshold), while the second conditional content 116-b may be displayed when the condition is not met.

The ad module 219 renders a sponsored user-selectable link (i.e., an advertisement) based on the selected conditional content 116 and the one or more access mechanisms 114 contained in the conditional ad object 112. In this way, the ad module 219 can display content that the advertiser deems to be more relevant to the user in an advertisement, without the advertising system 300 being privy to sensitive information.

Figure 3A:
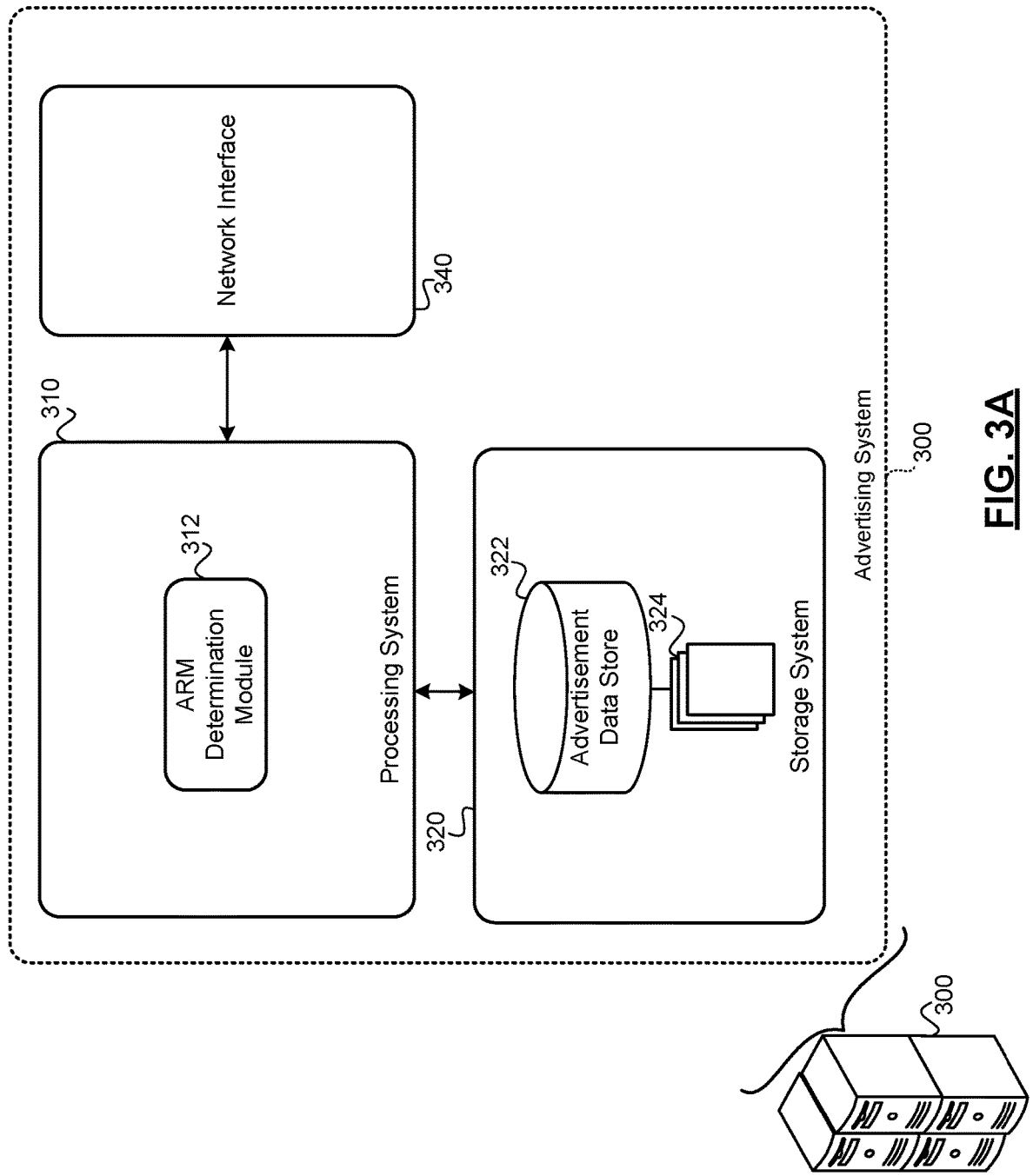
FIG. 3A is a schematic illustrating an example set of components of an advertising system.

FIG. 3A illustrates an example of an advertising system 300. The advertising system 300 may receive ad requests 120 and may return an ARM 110. The advertising system 300 may receive ad requests 120 from a user device 200 directly or from an intermediate device, such as a search system 160. The advertising system 300 includes a processing system 310, a storage system 320, and a network interface device 340.

The processing system 310 is a collection of one or more processors that execute computer-readable instructions. In implementations having two or more processors, the two or more processors can operate in an individual or distributed manner. In these implementations, the processors may be connected via a bus and/or a network. The processors may be located in the same physical device or may be located in different physical devices. Moreover, the processors may be located at different physical locations. The processing system executes an ARM determination module 312.

The network interface device 340 includes one or more devices that perform wired or wireless (e.g., Wi-Fi or cellular) communication. Examples of the devices may include, but are not limited to, a transceiver configured to perform communications using the IEEE 802.11 wireless standard, an Ethernet port, a wireless transmitter, and a universal serial bus (USB) port.

The storage system 320 includes one or more memory devices. The memory devices may be any suitable type of computer-readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 320 stores an advertisement data store 322. Example contents of the advertisement data store 322 is discussed in greater detail below.

The advertisement data store 322 stores an advertisement inventory. An advertisement, when rendered at a user device 200, includes a user-selectable link that links to a particular state of an application. Advertisements are provided by advertisers (i.e., any third party). Typically advertisers agree to pay a price-per-action for an advertisement. Examples of a price-per-action include a price-per-impression, a price-per-click, and a price-per-purchase. While price-per-action schemes are the most prevalent, advertisers may agree to other fee arrangements.

Figure 3B:
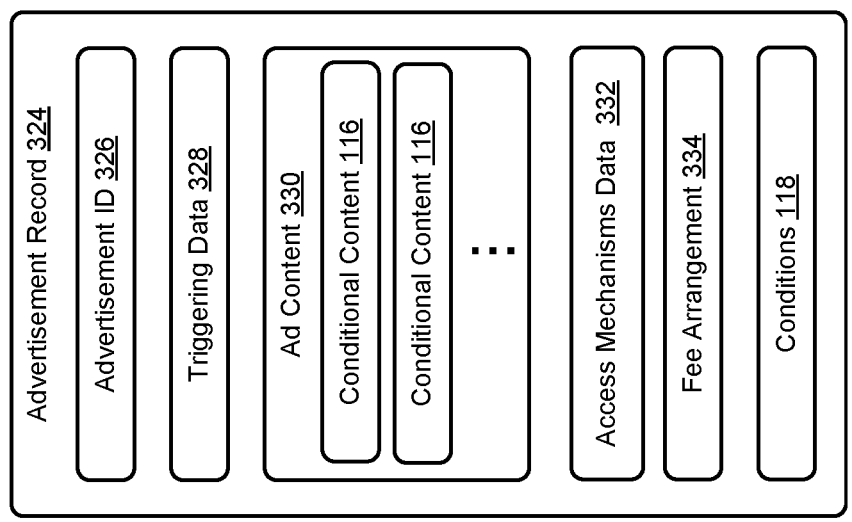
FIG. 3B is a schematic illustrating an example advertisement record format.

In some implementations, the advertisement inventory is comprised of a plurality of advertisement records 324. Each advertisement record 324 corresponds to an advertisement. FIG. 3B illustrates an example of an advertisement record 324. The advertisement record 324 may include an ad ID 326, triggering data 328, ad content 330, access mechanism data 332, a fee arrangement 334, and one or more conditions 336.

The ad ID 326 can be any string of letters, numbers, and/or characters that uniquely identify the advertisement from other advertisements. The ad ID 326 may be a unique number, a URL corresponding to the ad, an alphanumeric string, an application resource identifier, and/or a text string describing the advertised state or any other suitable string. The ad ID 326 may be generated and assigned to the advertisement record 324 when the record is generated by the advertising system 300.

The triggering data 328 is the data that causes the ARM determination module 312 to consider including the advertisement in an ARM 110. Put another way, the ARM determination module 312 identifies advertisement records 324 based on the contents of the ad request 120 and the triggering data 328 of the advertisement records 324. Triggering data 328 can include keywords, application state identifiers (e.g., URLs or other types of state identifiers), application identifiers (e.g., application names or application IDs), or user preferences (e.g., "likes" on a social networking application). The triggering data 328 can be indexed in an inverted index that is queried with information from an ad request 120 (e.g., one or more keywords, an application state, an application identifier, or a user preference) and outputs advertisement records 324 that contain the triggering data 328 or the ad IDs 326 of such advertisement records 324.

The ad content 330 includes any data that is displayed in the advertisement when rendered. Ad content 330 can include text (e.g., a description of the linked-to state or a description of a product), visual data such as icons or pictures, video data, or any other suitable data. The ad content 330 may include the actual data and/or pointers to memory locations where the actual data may be found. In some records, the ad content 330 includes two or more instances of conditional content 116.

Each instance of the conditional content 116 may be associated to a condition 118 (discussed further below). For example, each instance of conditional content 116 may be assigned a value or tag. The value or tag may also be used in the condition, such that the condition defines which conditional content 116 to use by way of the value or tag. The conditional content 116 may be uploaded by an advertiser. Furthermore, the ad content 330 may contain unconditioned content (not shown). Unconditioned content may refer to content that is displayed in an advertisement regardless of whether a condition 118 is met. The ad content 330 may include an icon of an application or a name of a linked to application.

The access mechanism data 332 includes one or more access mechanisms 114 that link to the advertised state of an application. The access mechanisms data can include web resource identifiers, application resource identifiers, and/or scripts. As a state of an application may be accessed using different application editions (e.g., web application editions or different native application editions), there may be more than one access mechanism 114 that may be used to access a state of an application. For instance, a first access mechanism may be a URL used to access a state of an application via a web browser. A second access mechanism may be an application resource identifier that is used to access the same state of the application via a first native application edition configured for a first operating system. A third application access mechanism may be an application resource identifier that is used to access the same state via a second native application edition configured for a second operating system. In some implementations, the access mechanism data 332 may further include templates for generating access mechanisms.

The fee arrangement 334 may define the agreement between an advertiser and the advertising system 300. The fee arrangement 334 can define the action that the advertiser wishes to pay for. For example, the fee arrangement 334 can define whether the advertiser agrees to pay for an impression, a click, or a purchase. The fee arrangement 334 also defines the cost per action. For example, the cost may be fifty cents per click or ten cents per impression.

The conditions 118 are rules that define which conditional content 116 is to be displayed in an advertisement. As previously discussed, conditions may relate to an installation status of an application, a subscription or account status with respect to an application, whether an application was recently used by the user, a device type (e.g., operating system and/or make and model) of a user device, and/or a sensor output of the user device. In some implementations, an advertiser can define the conditions using a portal. The conditions may be structured as if-then statements, whereby if a condition is met, then a particular instance of conditional content is to be used. In some implementations, the conditions are defined as Boolean statements that when satisfied may result in the impression of the corresponding conditional content 116. For example, a condition 118 of an advertisement may be: If Application A is installed on the user device, then display conditional content one; else, display conditional content two. In another example, the conditions 118 may be: If operating system type is iOS, show image one; if operating system type is ANDROID, show image two; if operating system type is WINDOWS PHONE, show image three. The conditions 118 can be expressed in any suitable notation without departing from the scope of the disclosure.

The advertising system 300 may include a portal (not shown) that allows advertisers to upload the data to generate an advertisement record 324. The portal allows a user to provide the information needed to generate an advertisement record 324. For example, the portal may allow an advertiser to enter the triggering data, the conditional content 116, non-conditional content, one or more access mechanisms that link to an advertised state, information relating to the fee arrangement, and the conditions. The portal may also require the advertiser to provide other information, such as an account name or payment information. The portal may implement various types of user interface elements, including drop down menus and text input elements.

Referring back to FIG. 3A, the ARM determination module 312 may be comprised of a set of computer-readable instructions that are executed by the processing system 310. In some implementations, the ARM determination module 312 receives an ad request 120 and returns an ARM 110. The ARM determination module 312 uses the content of the ad request 120 to determine which conditional ad objects 112 to include in the ARM 110.

The ARM determination module 312 receives the ad request 120 and identifies one or more advertisement records 324 based on the ad request 120. In some implementations, the ARM determination module 312 queries the inverted index with information contained in the ad request 120. For example, the ARM determination module 312 may query the inverted index with one or more query terms received in a search query 102, an application identifier of an application that issued the ad request, a state identifier that indicates a current state being accessed at the user device 200, and/or an entity identifier indicating an entity that is referenced in the currently accessed state. An ad request 120 may contain any suitable data that would trigger an advertisement. For example, the data may include an application identifier of an application currently being accessed or an entity identifier of an entity referenced at the state (e.g., the title of a movie or the name of a person). The inverted index returns advertisement records 324 (or ad IDs 326 thereof) that have triggering data 328 that match to the content in the ad request 120.

The ARM determination module 312 ranks the returned advertisement records 324. In some implementations, the ARM determination module 312 can rank the returned advertisement records 324 based on a respective score of each advertisement record 324. The score of an advertisement record 324 can be calculated in any suitable manner. In some implementations, the score may be based on the expected value of the advertisement. The expected value may be calculated at request time or may be calculated off-line. In the event that the expected value is calculated at request time, the expected value may be a function of the ad request, the fee arrangement, the triggering data that caused the advertisement record to trigger, and historical data relating to the advertisement. For instance, in a cost-per-click fee arrangement, the expected value may be the product of the price per click and the probability of a click given the ad request 120. Thus, the ARM determination module 312 may reference historical data to determine how often the particular ad is selected when displayed in response to certain triggering data (e.g., how often users click on the advertisement when a search query 102 contains a particular term). In other examples, if the fee arrangement is a cost-per-impression arrangement, then the expected value is equal to the cost-per-impression, as the probability of an impression is one.

In some implementations, the ARM determination module 312 determines the score of an advertisement record 324 based on a degree to which the triggering data 328 of an advertisement record 324 matches the content of the ad request 120. For instance, if the triggering data 328 contains query terms and the ad request 120 includes terms from a search query, then the score of the advertisement record 324 may be based on the degree to which the keywords in the triggering data 328 match the terms of the search query 102.

In some implementations, the ARM determination module 312 may use scoring functions to score the advertisement records 324. Additionally or alternatively, the ARM determination module 312 may determine feature vectors corresponding to each advertisement record 324 and may feed the feature vectors into a machine learned scoring model (e.g., gradient boosted decision trees). In these implementations, the scoring model outputs a score of the advertisement record 324 based on the feature vector and previously learned data. The feature vector of an advertisement record 324 may include features of the advertisement record itself, features of the content of the ad request, and features of the content of the ad request 120 in relation to the advertisement record. The ARM determination module 312 can determine the score of an advertisement record in any other suitable manner.

The ARM determination module 312 can rank the advertisement records 324 based on their respective scores. The ARM determination module 312 then generates an ARM 110 based on the ranked advertisement records 324. The ARM determination module 312 may select the highest M ranking advertisement records for inclusion in the ARM 110 or may include all of the ranked advertisement records 324 for inclusion in the ARM 110. For each advertisement record 324 that is to be included in the ARM 110, the ARM determination module 312 generates an ad object based on the advertisement record 324. The ad objects may include one or more conditional ad objects 112. A conditional ad object 112 includes two or more instances of conditional content 116 that are included in the ad content 330 contained in the advertisement record 324 and one or more conditions 118 based on the conditions 118 contained in the advertisement record 324. The conditional ad object 112 may further include unconditioned content. The conditional ad object 112 may further include one or more access mechanisms 114 based on the access mechanism data 332 contained in the advertisement record 324. The conditional ad object 112 may include instructions and additional data that is used to render the ad at the user device 200. The ARM determination module 312 inserts the conditional ad objects in the ARM 110 in accordance with rankings of the respective advertisement record 324. In some implementations, the ARM determination module 312 may further include one or more unconditioned conditional ad objects in the ARM 110.

The ARM determination module 312 (or a related module) transmits the ARM 110 to a downstream device. In some implementations, the ARM determination module 312 transmits the ARM 110 directly to the user device 200 that provided the ad request 120. In other implementations, the ARM determination module 312 transmits the ARM 110 to an intermediate device such as a search system 160 or application system (e.g., an application server). In this scenario, the intermediate device may transmit the ARM 110 to the user device 200 that provided the ad request 120.

Figure 4:
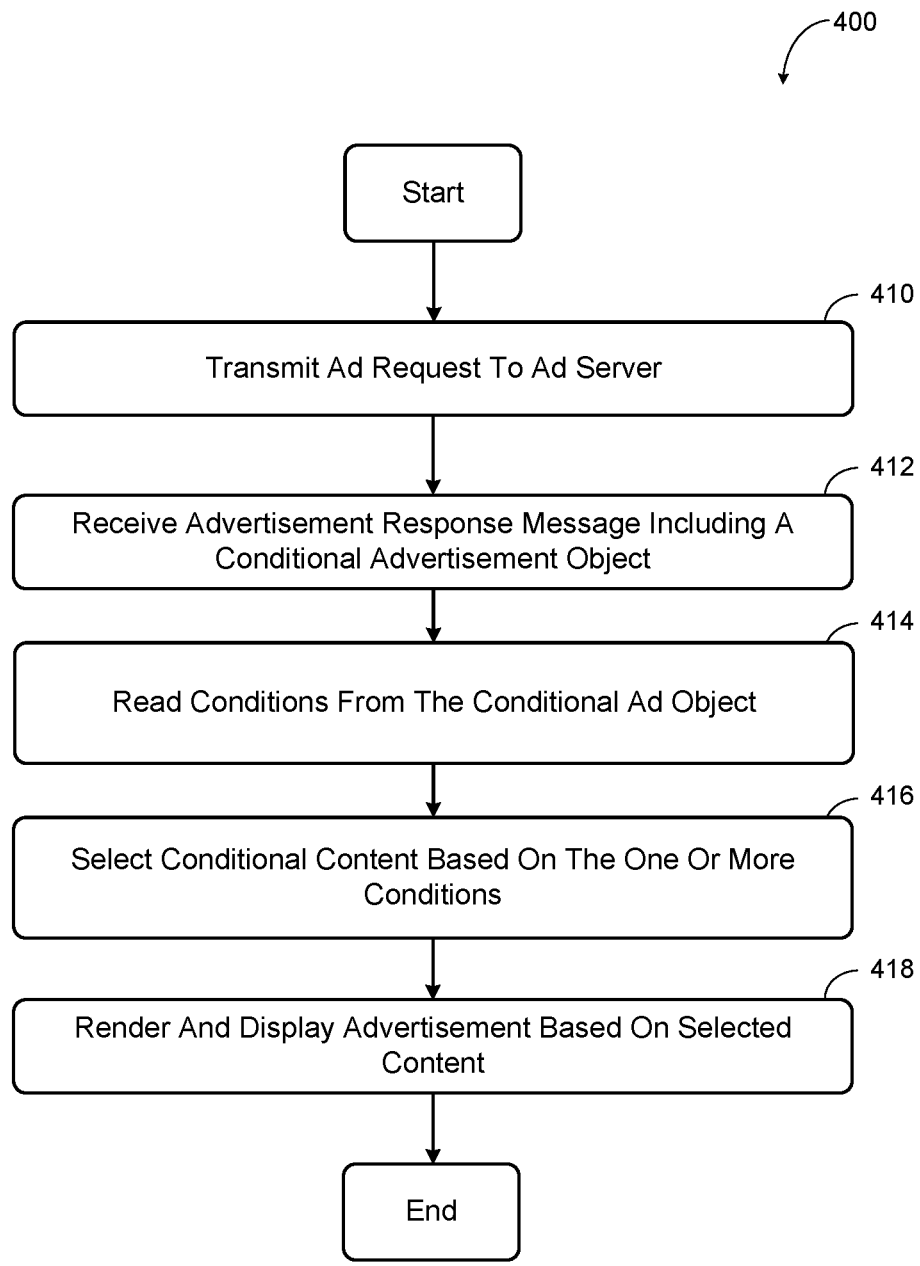
FIG. 4 is a flowchart illustrating an example set of operations of a method for displaying an advertisement.

FIG. 4 is a flowchart illustrating an example set of operations of a method 400 for displaying advertisements on a user device. The method 400 helps protect the privacy of users of user devices 200. The method 400 may be executed by a processing device 210 of a user device 200. For purposes of explanation, the method 400 is described with respect to an ad module 219, which may be called by any suitable application.

At 410, the ad module 219 transmits an ad request 120 to a remote computing device. For example, the ad module 219 may transmit an ad request 120 to an advertising system 300. In other implementations, a search application 212 transmits a search query 102 to a search system 160, which in turn transmits an ad request to the advertising system 300. The ad request 120 may include information to trigger ads as well a number of requested advertisements.

At 412, the ad module 219 receives an ARM 110 from the remote computing device. The ARM 110 includes a conditional ad object 112. The conditional ad object 112 includes two or more instances of conditional content 116, one or more access mechanisms 114, and one or more conditions 118. The ad module 219 may receive the ARM 110 independently or with other data (e.g., in a set of search results 140). Furthermore, the ARM 110 may include other ad objects, including other conditional ad objects 112.

At 414, the ad module 219 reads the condition 118 or conditions 118 from the conditional ad object 112. As previously discussed, a condition 118 may be associated with an instance of the conditional content 116. The conditions may be expressed in any suitable notation.

At 416, the ad module 219 selects an instance of conditional content 116 based on the one or more conditions 118. As previously indicated a condition may be if-then rules, whereby if the condition is verified, then a particular instance of the conditional content 116 is selected for inclusion in the ad. In some scenarios, each instance of conditional content 116 is associated with a respective condition 118. In other scenarios, if a condition cannot be verified, then the condition defines another instance of conditional content 116 to select for inclusion in the advertisement. As previously discussed, the ad module 219 may cross-check the conditions with information requested from the operating system 218 and/or sensors of the user device 200. For instance, the ad module 219 may request a list of installed applications, a list of recently accessed applications, a list of subscriptions of the user, and/or a device type of the user device 200 from the operating system 218. The operating system 218 returns the requested list, and the ad module 219 attempts to verify the condition(s) 118 based on the returned data. In another example, the ad module 219 may request a sensor reading from an ambient light sensor (or analogous sensor). The ad module 219 selects an instance of conditional content 116 based on whether the condition(s) 118 was/were verified by the ad module.

At 418, the ad module 219 renders a user-selectable link based on the selected conditional content 116, any unconditioned content, and the access mechanisms 114 in the conditional ad object 112. The ad module 219 can output the user-selectable link to a graphical user interface of an active application (i.e., in or overlaying the graphical user interface of the active application). The active application includes a layout that defines the graphical user interface, including instructions that indicate the location in the graphical user interface where the advertisement is to be presented. The ad module 219 may output the advertisement (e.g., a user-selectable link) to the application, which in turn outputs the advertisement to its graphical user interface.

Figure 5:
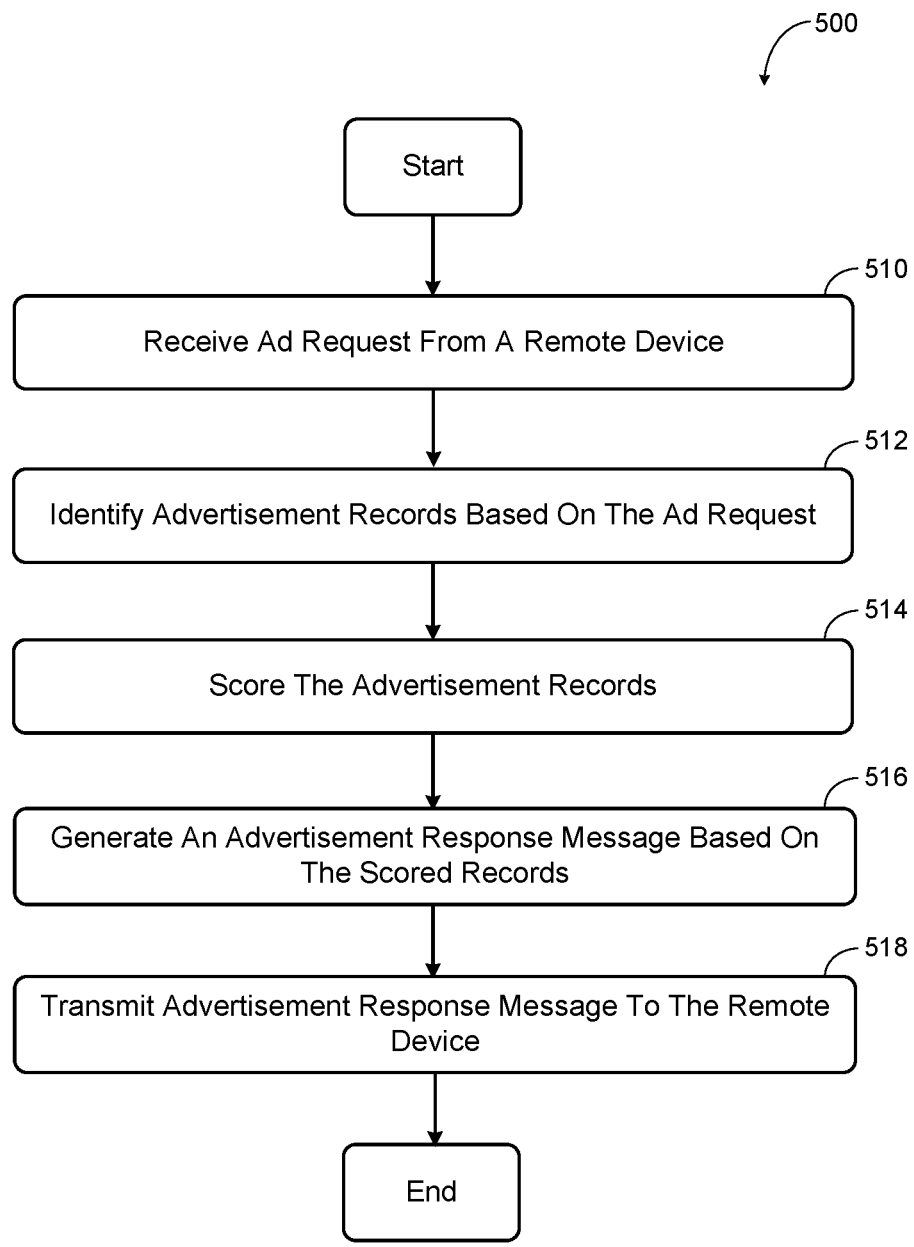
FIG. 5 is a flowchart illustrating an example set of operations of a method for generating and serving a conditional advertisement.

FIG. 5 illustrates an example method 500 for generating an ARM 110. The method 500 may be performed by any suitable device. For purposes of explanation, the method 500 is explained with respect to the advertising system 300 described above.

At 510, the ARM determination module 312 receives an ad request 120 from a remote computing device. The remote computing device may be a search system, a user device, an application server, or the like. The ad request 120 may include any suitable data, including but not limited to, query terms provided in a search query, a URL of an accessed application state, an application identifier of an accessed application, and/or an entity identifier of an entity referenced at the application state.

At 512, the ARM determination module 312 identifies one or more advertisement records 324 from the advertisement data store 322 based on the ad request 120. In some implementations, the ARM determination module 312 queries an inverted index with the content of the ad request 120. For example, the ARM determination module 312 may query the inverted index with one or more query terms contained in the ad request 120 or a state identifier included in the ad request 120. The inverted index may return advertisement records 324 that were relevant to the data used to query the inverted index.

At 514, the ARM determination module 312 ranks the identified advertisement records 324. The ARM determination module 312 may score each advertisement record 324. The ARM determination module 312 may score the advertisement records 324 in any suitable manner. In some implementations, the ARM determination module 312 may score the advertisement records 324 based on an expected value associated with each advertisement record 324. Additionally or alternatively, the ARM determination module 312 may score the advertisement records 324 based on a degree to which the triggering data of each advertisement record 324 matches the content of the ad request 120. Additionally or alternatively, the ARM determination module 312 may score the advertisement records 324 using predetermined scoring functions. Additionally or alternatively, the ARM determination module 312 may determine feature vectors corresponding to each advertisement record 324 and may feed the feature vectors into a machine learned scoring model (e.g., gradient boosted decision trees). In these implementations, the scoring model outputs a score of the advertisement record 324 based on the feature vector and previously learned data. The feature vector may include features of the advertisement records itself, features of the content of the ad request 120, and features of the content of the ad request 120 in relation to the advertisement record. The ARM determination module 312 may determine the score of the advertisement records 324 in any other suitable manner. The ARM determination module 312 ranks the advertisement records 324 based on their respective scores.

At 516, the ARM determination module generates an ARM 110 based on the ranked advertisement records. The ARM determination module 312 may select the M highest ranked records, where M may be defined in the ad request 120. The ARM determination module 312 may generate an ordered data structure (e.g., an array), whereby the each element of the data structure contains an ad object including one or more conditional ad objects 112. The ARM determination module 312 may include the ad content 330 (the conditional content 116 and unconditioned content), the one or more access mechanisms 114, and the one or more conditions 118 contained in the advertisement record 324 in the conditional ad object 112. The ARM determination module 312 includes the populated conditional ad object 112 in the ARM 110.

At 518, the ARM determination module 312 transmits the ARM 110 to the remote computing device. The ARM determination module 312 may transmit the ARM 110 to the remote computing device that requested the ARM 110. For example, the ARM determination module 312 may transmit the ARM 110 to the remote computing device that ultimately displays one or more of the advertisements defined in the ARM 110 (e.g., a user device). In other implementations, the ARM determination module 312 may transmit the ARM 110 to a search system 160, an application server, or the like.

The methods 400, 500 of FIGS. 4 and 5 are provided for example. Variations of the methods 400, 500 are contemplated and are within the scope of the disclosure.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. The functions of an application can be accessed using native application editions of the software application and/or web application editions of the software application.

A native application edition (or "native application") is, at least in part, installed on a user device 200. In some scenarios, a native application is installed on a user device 200, but accesses an external resource (e.g., an application server) to obtain data from the external resource. For example, social media applications, weather applications, news applications, and search applications may respectively be accessed by one or more native application editions that execute on various user devices 200. In such examples, a native application can provide data to and/or receive data from the external resource while accessing one or more functions of the software application. In other scenarios, a native application is installed on the user device 200 and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

Web application editions (also referred to as "web applications") of a software application may be partially executed by a user device 200 (e.g., by a web browser executed by the user device 200) and partially executed by a remote computing device (e.g., a web server or application server). For example, a web application may be an application that is executed, at least in part, by a web server and accessed by a web browser (e.g., a native application) of the user device 200. Example web applications may include, but are not limited to, web-based email, online auctions websites, social-networking websites, travel booking websites, and online retail websites. A web application accesses functions of a software product via a network. Example implementations of web applications include webpages and/or HTML5 application editions.

In some scenarios, a software application may be accessed by one or more native application editions of the software application and/or one or more web application editions of the software application. In these scenarios, there may be overlap between the states or functions that the native application edition(s) can access and the states or functions that the web application edition can access. A user device 200 can access a state of a software application via an edition of the software application using an access mechanism.

Examples of access mechanisms can include, but are not limited to, application access mechanisms, web access mechanisms, application download addresses, and scripts. An application access mechanism may be a string that includes a reference to a native application and indicates one or more parameters or operations that the user device 200 uses to access the referenced state. An application resource identifier is an example application access mechanism. In some implementations, application access mechanisms are platform specific. Thus, accessing a state of a software application via a first application edition configured for a first platform may require a different application access mechanism than an application access mechanism for accessing the state of the software application via a second application edition configured for a second platform.

A web access mechanism may be a string that includes a reference to a web application edition of a software product, and indicates one or more parameters and/or operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user-selectable link including a web access mechanism, the user device 200 may launch a web browser application and may pass the resource identifier to the web browser. The web browser can use the resource identifier to retrieve the web resource indicated in the resource identifier and/or access a function of the software application indicated by the resource identifier.

An application download access mechanism may indicate a location (e.g., a digital distribution platform) where a native application can be downloaded in the scenario where a native application edition of the application is not installed on the user device 200. If a user selects a user-selectable link including an application download access mechanism, the user device 200 may access a digital distribution platform from which the referenced native application edition may be downloaded. The user may opt to download the native application edition. Upon doing so, the user device 200 may launch the native application edition and may access the state of the software application using the native application edition and an application access mechanism associated with the user-selectable link.

A script is a set of instructions, that when executed by the user device 200 cause the user device to access a resource indicated by the script. For example, the script may instruct an operating system of the user device 200 to launch the native application, and may define one or more additional instructions to access a particular state of the application. Another type of access mechanisms may include scripts, which may be used instead of other type of access mechanism when an edition of a software application is not configured to be referenced by the other types of access mechanisms.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a user device, the method comprising:
   receiving a conditional ad object from an external device through a network interface of the user device, wherein the conditional ad object includes at least one condition and a plurality of content, the plurality of content including a first content and a second content distinct from the first content;
   identifying, by the processing device, whether the at least one condition is satisfied at the user device;
   based on the at least one condition being satisfied, selecting, by the processing device, the first content;
   based on the at least one condition being not satisfied, selecting, by the processing device, the second content;
   generating, by the processing device, a user-selectable link corresponding to the selected content between the first content and the second content; and
   outputting the user-selectable link via a user interface of the user device, wherein the at least one condition includes whether a first application which is related to the first content is installed on the user device, and
   wherein the identifying of whether the at least one condition is satisfied at the user device further includes:
   requesting a list of installed applications or a list of user accounts from an operating system of the user device, and
   cross checking the list of the installed applications or the list of user accounts for the first application.

2. The method of claim 1, wherein, when the first application is installed on the user device, the first content is selected.

3. The method of claim 1, wherein, when a user has an account registered for the first application, the first content is selected.

4. The method of claim 3, wherein the list of user accounts indicates applications to which the user has an account; and
   cross-checking the list of user accounts for the first application.

5. The method of claim 1, wherein, when the first application has been accessed within a specified time period, the first content is selected.

6. The method of claim 5, wherein identifying whether the at least one condition is satisfied at the user device further includes:
   requesting a list of recently accessed applications from an operating system of the user device, wherein the list of recently accessed applications indicates applications that were accessed within a time period; and
   cross-checking the list of recently accessed applications for the first application.

7. The method of claim 1, wherein, when an external environmental condition corresponds to a designated environment, the first content is selected.

8. The method of claim 7, wherein identifying whether the at least one condition is satisfied at the user device further includes:
   requesting a sensor reading from a sensor of the user device; and
   comparing the sensor reading to a specified value to determine whether the external environment corresponds to the designated environment.

9. The method of claim 1, wherein the conditional ad object is received in response to an ad request or a search query.

10. A non-transitory computer-readable medium having a set of computer-readable instructions stored thereon, the computer-readable instructions, when executed by a processing device of a user device, causing the processing device to:
- receive a conditional ad object from an external device through a network interface of the user device, wherein the conditional ad object includes at least one condition and a plurality of content, the plurality of content including a first content and a second content distinct from the first content;
- identify whether the at least one condition is satisfied at the user device;
- based on the at least one condition being satisfied, select a first content;
- based on the at least one condition being not satisfied, select the second content ;
- generate a user-selectable link corresponding to the selected content between the first content and the second content; and
- output the user-selectable link via a user interface of the user device,
- wherein the at least one condition includes whether a first application which is related to the first content is installed on the user device, and
- wherein the identifying of whether the at least one condition is satisfied at the user device further includes:
- requesting a list of installed applications or a list of user accounts from an operating system of the user device, and
- cross checking the list of the installed applications or the list of user accounts for the first application.

11. The non-transitory computer-readable medium of claim 10, wherein, when the first application is installed on the user device, the first content is selected.

12. The non-transitory computer-readable medium of claim 10, wherein, when a user has an account registered for the first application, the first content is selected.

13. The non-transitory computer-readable medium of claim 12,
- wherein the list of user accounts indicates applications to which the user has an account; and
- cross-checking the list of user accounts for the first application.

14. The non-transitory computer-readable medium of claim 10, wherein, when the first application has been accessed within a specified time period, the first content is selected.

15. The non-transitory computer-readable medium of claim 14, wherein identifying whether the at least one condition is satisfied at the user device further includes:
- requesting a list of recently accessed applications from an operating system of the user device, wherein the list of recently accessed applications indicates applications that were accessed within a time period; and
- cross-checking the list of recently accessed applications for the first application.

16. The non-transitory computer-readable medium of claim 10, wherein, when an external environmental condition corresponds to a designated environment, the first content is selected.

17. The non-transitory computer-readable medium of claim 16, wherein identifying whether the at least one condition is satisfied at the user device further includes:
- requesting a sensor reading from a sensor of the user device; and
- comparing the sensor reading to a specified value to determine whether the external environment corresponds to the designated environment.

18. The non-transitory computer-readable medium of claim 10, wherein the conditional ad object is received in response to an ad request or a search query.

* * * * *